Nov. 6, 1934. H. W. PRICE Re. 19,364

THERMOSTATIC GAS CONTROL

Original Filed Dec. 22, 1927 2 Sheets-Sheet 1

Inventor.
Harold W. Price
by
H. B. Dennison
Atty.

Nov. 6, 1934. H. W. PRICE Re. 19,364

THERMOSTATIC GAS CONTROL

Original Filed Dec. 22, 1927 2 Sheets-Sheet 2

Inventor.
Harold W. Price.

by
A. J. Dennison
Atty.

Reissued Nov. 6, 1934

Re. 19,364

UNITED STATES PATENT OFFICE 19,364

THERMOSTATIC GAS CONTROL

Harold W. Price, Toronto, Ontario, Canada, assignor, by mesne assignments, to Robertshaw Thermostat Company, Youngwood, Pa., a corporation of Pennsylvania Original No. 1,869,943, dated August 2, 1932, Serial No. 241,930, December 22, 1927. Renewed March 4, 1931. Application for reissue August 1, 1934, Serial No. 738,010

21 Claims. (Cl. 236—48)

The principal objects of this invention are to provide a device which will automatically operate effectively in the opening and closing of the supply of gas to a burner.

A further object is to devise a simple form of structure which will be very dependable in its operation, will be economical to build and will not deteriorate through use, and which may be taken apart and reassembled with ease and accuracy.

The principal features of the invention consist in the novel construction and arrangement of parts, whereby the gas valve is operated to open or close with a snap action through the impact of a pivotal arm thereagainst which is operated through the action of a spring which swings either side of the pivot support of said arm through the action of a lever co-operating with a thermostatic element.

In the drawings, Figure 1 is a longitudinal elevational part sectional view of my improved thermostatic device.

Figures 1, 5:
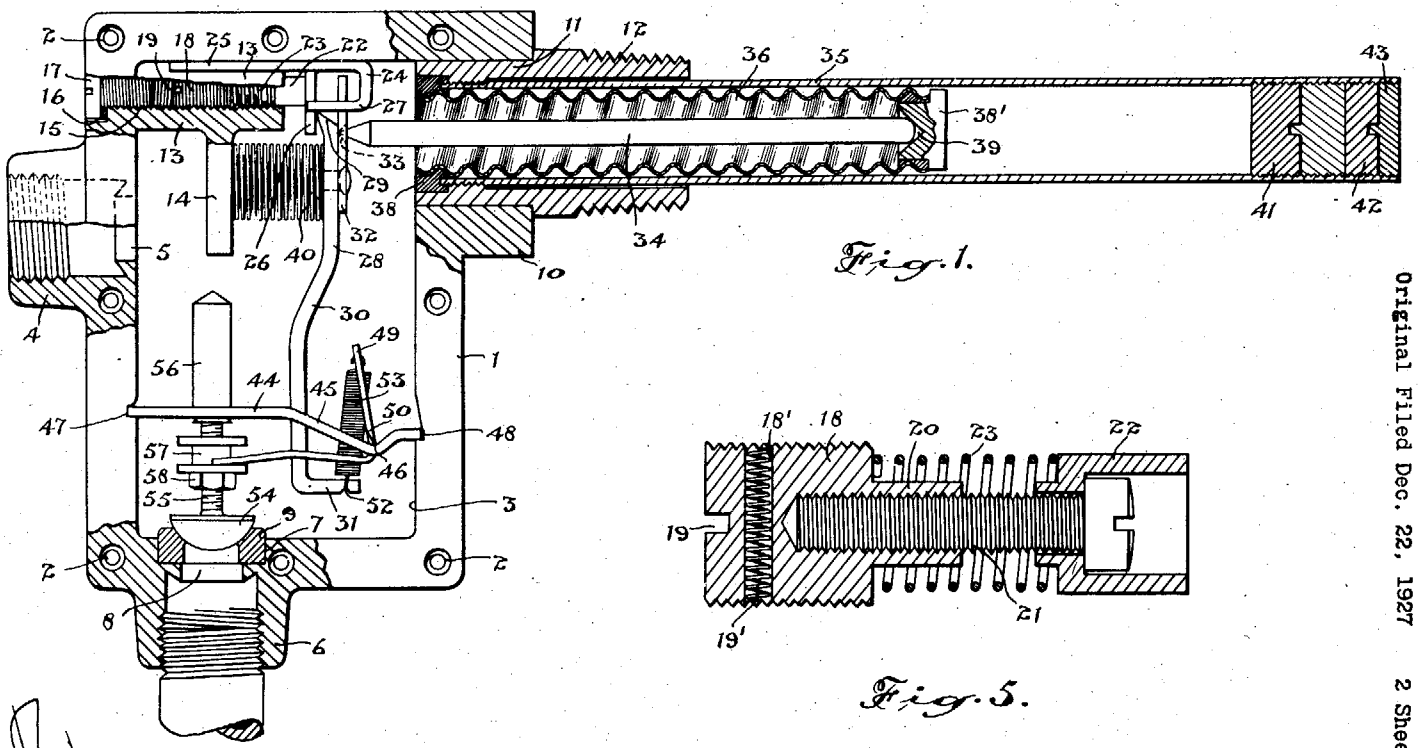
Figure 5 is a cross section of the regulating member.
Figure 2:
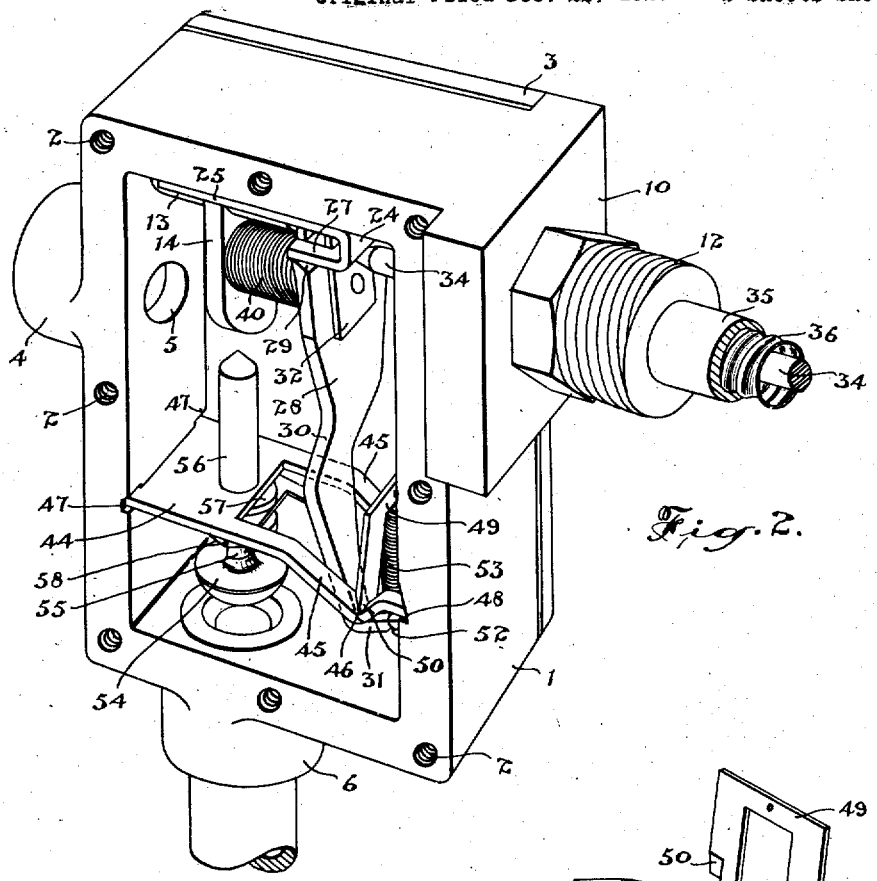
Figure 2 is a perspective view of the main casing enclosing the gas valve, the cover being removed.
Figure 4:
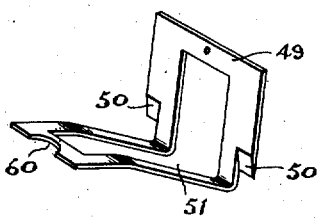
Figure 4 is a perspective detail of the valve operating arm or flip lever.
Figure 3:
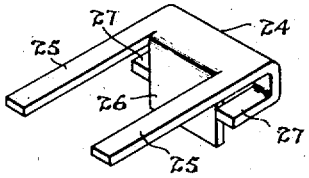
Figure 3 is a perspective detail of the adjustable balancing fulcrum for the main operating lever.

Referring to the accompanying drawings, the valve casing is formed of a rectangular frame 1 which is preferably formed open at the sides and is provided with a plurality of screw holes 2 extending in from the edges thereof into which suitable screws are inserted to secure the face plates 3 thereto.

A boss 4 is formed on one side of the frame and it is threaded internally to receive the gas supply pipe and an opening 5 extends into the casing.

A boss 6 is formed on the bottom of the frame adjacent to one side thereof and it is threaded to receive the gas outlet pipe.

A recess 7 is formed at the inner side of the opening 8 and extending through the boss 6 and the valve seat 9 is bedded therein. This valve seat is preferably formed of a soft alloy, such as a mixture of lead and tin.

A flanged extension 10 is formed on the outer face of the side of the frame opposite to the boss 4 and a ferrule 11 is preferably cast into the metal of the frame to extend through same and to project outwardly beyond the frame, said ferrule being preferably formed of brass and having a threaded outer end 12 adapted to be inserted into the entrance leading to a water reservoir or tank.

The brass insert is provided for the particular purpose of preventing contact between the water in the tank and the aluminum or zinc alloy of which the frame 1 is formed, thereby obviating a destructive electrolytic action that would deleteriously affect the casing at its point of connection with the tank.

A boss 13 is moulded at the inner side of the top of the frame 1 and this boss is provided with an integral downwardly extending flat lug 14.

The boss 13 is perforated longitudinally by a threaded opening 15 and a countersink 16 is formed at the outer end.

A cap screw 17 is threaded into the outer end of the opening 15 and the flanged head thereof is sealed against a gasket arranged in the countersink.

A screw member 18 is threaded in the opening 15 being provided with a slot 19 in the outer end and having a sleeve extension 20 at its inner end.

A screw 21 is threaded into an opening extending into the sleeve end of the screw 18 and a cylindrical member 22 is mounted on the head end of the said screw 21 and a spiral compression spring 23 is supported between the member 22 and the screw 18, said spring encircling the sleeve 20.

This device provides a spring regulating member arranged within the threaded boss with the cylindrical member 22 mounted on the screw 21 projecting beyond the inner end for a purpose as will hereinafter appear.

The screw 18 is formed with a hole 18′ extending across the head and a spiral spring 19′ is arranged therein and engages the threaded surface of the opening 15 and locks the screw from displacement through vibration particularly while the device is being handled.

A member 24 provided with a pair of parallel arms 25 slidably engages the underside of the top section of the frame 1, the arms 25 extending either side of the boss 13 which thus forms a guide.

A downwardly extending lug 26, arranged between the arms 25, forms the main lever support and a pair of arms 27 extend downwardly at each side of said lug.

The main lever 28 is formed with a bevelled offset knife edge 29 which rests against the outer face of the lug 26 and engages the underside of the arms 27.

The lever 28 which bears on a knife edge pivot extends downwardly and is formed with an offset 30 intermediate of its length and a right angle bend 31 at the bottom.

A plate 32 is secured to the upper end of the main lever on the side away from its knife-edge pivot and this plate is formed with a tapered recess 33 to receive the point of a rod 34 bearing against the lever 28 which rod extends into the thermostatic tube.

The thermostatic tube is a composite structure formed of an outer tube 35, preferably of copper or brass which is threaded into the brass insert ferrule 11.

A flexible corrugated thermostatic tube 36 extends into the tube 35 from its inner end and the inner ends of both of said tubes are sealed in a solder joint 38 to the brass insert.

The inner end of the corrugated tube 36 is open to the interior of the frame 1 and the outer end thereof has securely soldered therein a plug 38′ which is provided with a conical seat 39 in which the outer rounded end of the rod 34 rests.

The rod 34 is held in place by the pressure of a compression spring 40 which is arranged between the flat lug 14 and the main lever 28 and maintains a continuous pressure against the lever and said rod.

The outer end of the tube 35 is sealed, first with a brass plug 41 threaded into the tube over which is placed a filling of litharge which is enclosed at the outer side by a brass plug 42 and the extremity of the tube is closed with a solder filler 43. The litharge forms an effective seal to retain the oil in the tube.

The tube 35 is filled with oil prior to its being sealed and the volumetric expansion and contraction of the oil under changing temperatures increases or relieves the pressure on the corrugated tube 36 and the resultant movement of the plug 38′ is transmitted through the rod 34 to the main lever 28.

A bridge 44 in the form of a sheet metal stamping extends across the frame 1 adjacent to its lower end, said bridge being formed with a pair of spaced bars 45 at one end, which bars are bent downwardly to form a pair of V-shaped bearings 46.

The bridge is secured in position, having one end inserted into the notches 47 formed in the inner wall of the frame and the ends of the spaced bars 45 are placed in the notches 48 on the other side of the frame.

A flip lever 49 is formed of a thin piece of sheet metal bent at substantially a right angle and having knife-edge bearings 50 on either side of its upright portion adapted to bear in the V bearings 46 in the bridge 44.

The lever 49 is formed with a central slot 51 and the lower end of the main lever 28 extends through the bridge 44 and slot 51 of the flip lever.

The right angularly bent portion 31 of the main lever is provided with a notch 52 on the underside and this notched end extends beneath the V bearing portion of the bridge 44 and swings thereunder in accordance with the movement of the thermostat rod 34.

A coil spring 53 is suspended from the upper end of the flip lever 49 and is hooked into the notched end 52 of the main lever and as the said end 52 of the main lever moves to either one side or the other of the pivot point of the lever 49 the said lever 49 is tilted with a movement accelerated by the pull of the spring and the free end of the lever moves up and down with a very sharp snap action due to the fact that the top end of the lever 49 swings past the point of leverage simultaneous with the movement of the main lever carrying the bottom end of the spring past the lever fulcrum in the same direction.

A valve 54 which is formed with a part spherical face rests upon the valve seat 9 closing the entrance to the gas pipe leading from the casing.

The threaded stem 55 of said valve extends into a tubular guide 56 rigidly secured to the bridge 44.

A flanged spool 57 is threaded on the valve stem 55 and is secured in an adjusted position by a lock nut 58 or it is preferably soldered permanently in place.

The free end of the flip lever 49 extends between the flanges of the spool 57 and is preferably provided at its end with a notch 60 which allows the extremities of the lever to engage the flanges of the spool at points diametrically opposite the centre thereof. The flanges of the spool are spaced apart so that the free end of the lever has considerable latitude of movement and acquires its accelerated movement either up or down so that it strikes either flange a sharp blow and moves the valve with such rapidity that an instantaneous opening or closing of the valve is effected.

The mechanism arranged within the frame 1 is completely enclosed by the face plates 3 which with the frame 1 form a gas tight casing.

The compression spring 40 maintains a constant contact between the main lever and the rod 34 and the operating end of the lever 28 and the spring 53 is retained in constant tension holding the free end of the flip lever in a position either down or up according to the position of the main lever.

The temperature regulating operation of the main lever is regulated and limited by the movement of the slidable member 24 which forms the main lever bearing contact, such regulation being effected by the adjustment of the cylindrical member 22 carried by the screw 21 mounted on the adjustable screw 18 arranged in the boss 13. The coil spring 23 is sufficiently stiff to resist any pressure exerted by the thermostatic action but prevents the possibility of damage to the mechanism through improper adjustment of the screw 18.

In the operation of this device the thermostat is secured in a tank, the contents of which are to be maintained at a predetermined temperature, the threaded end of the brass insert being screwed into the tank so that the thermostatic tube is immersed in the fluid contained in the tank.

The temperature of the fluid within the tank effects a volumetric change in the oil enclosed in the tube 35 and as it expands or contracts the pressure against the corrugated tube and the rod 34 carried thereby is varied so that the lever 30 is swung on its pivot so that the lower end thereof will swing beneath the V bearings in the bridge 44 extending across the frame. This swinging movement of the main lever carries the spring 53 with it in the manner described and as it swings in either direction past the vertical centre line of support of the flip lever, said lever is tilted with a sharp snap action so that a corresponding movement is imparted to the valve 54 to either open or close the passage leading from the gas chamber within the frame. This snap action of the valve eliminates the dangers of back firing in the burner.

The device is entirely mechanical in its operation. It is simple and rugged in its construction and will not be liable to get out of order. The adjustments are simple and once properly made will remain indefinitely so. A dependable and economical form of thermostat is thus produced.

While I have shown and described a preferred embodiment of my invention, it will be understood that I do not intend to be limited thereby, for my invention may be otherwise embodied within the scope of the appended claims.

In the drawings I have shown the control element to be actuated by the flip lever as a valve. My invention, however, is not limited to structures wherein the control element is a valve for it is equally applicable to structures embodying various types of control elements, for instance, in structures wherein the control element is a switch or the like.

In the drawings I have shown a particular type of thermally responsive device. My invention is not to be limited thereby for various types of thermally responsive devices may be used in structures embodying my invention, such as the ordinary rod and tube type or any of the various expansible bellows types.

What I claim as my invention is:—

1. Thermostatic fluid control mechanism comprising a lever, a thermostatic member engaging said lever, a yieldable fulcrum for said lever, a fluid valve, an actuating lever for said valve, and extensible means extending between the first named lever and the actuating lever and directly connected to both of same and exerting tension therebetween, said extensible means being movable across the fulcrum point of said actuating lever on movement of said first named lever in response to thermal changes whereby said actuating lever will be rapidly swung about its fulcrum point.

2. Thermostatic fluid control mechanism comprising a lever, a thermostatic member engaging said lever, a shiftable fulcrum for said lever movable in a direction substantially parallel to the direction of movement of said thermostatic member, yieldable means engaging said fulcrum and acting to urge the lever toward said thermostatic member, means for altering the effective thrust of said yieldable means, a fluid valve, an actuating lever for said valve, and extensible means extending between the first named lever and the actuating lever, and secured thereto and exerting tension therebetween, said extensible means being movable across the fulcrum point of said actuating lever on movement of said first named lever in response to the thermal changes whereby said actuating lever will be rapidly swung about its fulcrum point.

3. A thermostatic gas control, comprising a casing, a main lever mounted within said casing, a flexibly supported pivot supporting said main lever, a thermostatic member engaging said main lever and holding it in contact with said flexible support, a gas valve, a secondary lever operating said gas valve mounted on a fixed pivot, and a tension spring extending between the secondary lever and the main lever and adapted to swing said secondary lever to either side of its pivotal centre on the movement of the main lever.

4. A thermostatic gas control, comprising a casing, a member slidably arranged within said casing and forming a pivot support for the main lever, a main lever having a pivotal edge contacting with said slidable support at a fixed point relative thereto, a spring engaging the main lever, a thermostatic member engaging said main lever in opposition to said spring, said main lever support being slidable longitudinally of said thermostat member, a spring connected to the free end of the main lever and arranged substantially parallel with the main lever, a secondary lever mounted in said casing on a fixed pivot and having an extension beyond said pivot disposed substantially parallel with the main lever and connected with one end of the secondary lever, a gas valve operatively connected with the other end of the secondary lever, and means extending through said casing for sliding said main lever pivot point to adjust the position of same longitudinally of said thermostatic member.

5. A thermostatic gas control, comprising a casing having a thermostatic member extending from one side thereof, a slidable contact member arranged within the casing opposite the inner end of said thermostatic member, means for regulating the movement of said slidable member, a lever pivotally engaging said slidable member, means extending between said lever and said thermostatic member to swing said lever on its pivot, spring means holding said lever in contact with the means extending from the thermostatic member, a gas valve arranged in the casing, a secondary lever pivotally mounted intermediate of its length having one end engaging the gas valve, and a tension spring connected to the other end of the secondary lever and connected to the free end of the main lever and adapted to swing the secondary lever with a snap movement.

6. A thermostatic gas control, comprising a casing, a thermostatic element extending from one side of the casing, a lever co-operating with said thermostatic element, spring means for holding said lever in engagement with said thermostatic element, a fulcrum member for said lever mounted in said casing and slidably adjustable longitudinally of said thermostat element, means adjustably arranged in said casing for adjusting said fulcrum, a gas valve, a lever operatively connected with the gas valve, and spring means connecting the latter lever with the main lever to operate said gas valve to open or close.

7. A thermostatic gas control, comprising a rectangular-shaped frame open at the sides having gas inlet and outlet openings, a thermostatic member secured in one side of said frame, a main lever pivotally mounted within the frame, a bridge member extending across the frame, a valve guided from said bridge member to close the gas outlet, a valve-operating lever pivotally mounted at an intermediate point on said bridge member, a tension spring connecting the valve operating lever with said main lever, and plates closing the sides of said frame.

8. Fluid control mechanism comprising a casing having inlet and outlet ports for fluid, a member carried by said casing and movable in response to change in physical conditions, a main lever disposed within said casing and operatively associated with said member, a removable member supported within said casing, a valve for controlling one of said ports guided by said removable member, a valve actuating lever fulcrumed on said removable member, and an extensible connection between said levers for swinging said valve actuating lever on movement of said main lever in response to a change in physical conditions.

9. A thermostatic gas control, comprising a rectangular frame cast with a boss at one side thereof with an inlet opening to the interior and a boss on the bottom thereof with an opening to the interior and a boss on the opposite side, a brass insert cast into the latter boss and extending outwardly therefrom, a tubular thermostat secured within said brass insert, a rigid rod extending into the frame from said tubular thermostat, a main lever pivoted within the casing and engaging said rod, means for flexibly holding said lever against said rod, a bridge extending across said frame intermediate of its height, a valve slidably engaging said bridge, a lever pivoted on said bridge and engaging said valve, a spring connecting said main lever and the lever pivoted on said bridge and adapted to operate the latter lever upon the movement of the former through the medium of said spring to raise or lower said valve with a snap action, and plates closing the open sides of said frame.

10. A thermostatic gas control, comprising an open frame having a gas inlet and a gas outlet, a valve closing said gas outlet having a threaded spindle, a spool adjustably mounted on said valve spindle, a bridge extending across said frame having a guide engaging said valve spindle in sliding contact, said bridge having an opening therethrough and depressions in the side members forming V bearing, an angular-shaped lever having knife edges resting in said V bearings and the central portion extending through the opening in said bridge, said lever having a central opening therein, a main lever pivotally mounted in the frame above said bridge and having an end extending through the openings in said bridge and in the aforesaid lever, a coil spring connected with the upper end of the lever carried by the bridge and secured to the lower end of the main lever, flexible means for supporting said pivotal main lever, a thermostatic member engaging said main lever, and means for closing said frame.

11. A thermostatic gas control comprising a casing having gas inlet and outlet ports, a valve for opening or closing one of said ports, a valve operating lever pivotally mounted intermediate of its length in the casing having one end operatively engaging said valve and having the other end extending freely beyond said pivotal mounting toward one end of said casing, a main lever pivotally mounted at one end in the end of the casing toward which the valve operating lever extends, the other end of said main lever extending freely beyond the pivot point of said valve operating lever, a tension spring connecting the free ends of said valve operating and main levers and extending across the pivot point of the valve operating lever, said spring being adapted by the movement of said main lever in either direction to occupy a position at either side of said valve lever pivot, and thermostatic means for actuating said main lever.

12. A thermostatic gas control comprising a casing having gas inlet and outlet passages, a valve for opening or closing said outlet, said valve being slidably mounted and having a pair of flanges on the stem thereof spaced apart, a valve operating lever pivotally mounted intermediate of its length in the casing having one end arranged loosely in the space between said valve flanges and having a distinct latitude of movement therebetween, said lever having the other end extending freely beyond said pivotal mounting toward one end of said casing, a main lever pivotally mounted at one end in the end of the casing toward which the valve operating lever extends, the other end of said main lever extending freely beyond the pivot point of said valve operating lever, a tension spring connecting the free ends of said valve operating and main levers and extending across the pivot point of the valve operating lever, said spring being adapted by the movement of said main lever in either direction to occupy a position at either side of said valve lever pivot, and thermostatic means for actuating said main lever.

13. In a thermostatic gas control, the combination with a casing having inlet and outlet passages and a valve controlling one of said passages, of a main thermostatically operated lever arranged within said casing, a secondary valve-operating lever arranged within said casing, each of said levers having bearing points, bearing supports for said levers, and a spring operatively connecting said main and secondary levers and supporting each of the said levers in their assembled relation with their bearing points in pressure contact with their respective bearing supports, said secondary lever being operated by said spring to open said valve with a snap action.

14. In a thermostatic gas control, the combination with a casing having inlet and outlet passages and a valve controlling one of said passages, of a bridge member removably mounted in said casing, a main lever having a knife contact bearing in said casing, a secondary valve-operating lever having a knife bearing contact with said removable bridge, and a coiled spring operatively connecting said main and secondary levers, said spring acting to maintain said levers and bridge member in their assembled relation in said casing.

15. In a thermostatic gas control, the combination with a casing having inlet and outlet passages and shoulders arranged on the opposite walls of said casing, of a bridge member resting at its ends on said shoulders, a gas control valve mounted on said bridge, a bearing support, a main lever having an edge contact bearing at its upper end adapted to bear upwardly against said bearing support and having its lower end extending below said bridge, a secondary lever having an edge contact bearing adapted to bear downwardly against said bridge and having a portion extending above said bridge, said secondary lever operatively engaging said valve, and a tension spring operatively connecting the lower and upper ends respectively of said main and secondary levers and extending transversely of said bridge, said spring acting to retain said levers and bridge in their assembled relation.

16. In a thermostatic gas control, an upright casing having notches formed in the inner side walls, the upper edge of one of said notches being cut away, a bridge member extending between the side walls of said casing having its ends loosely resting in said notches, a main lever, a secondary valve-operating lever mounted on said bridge adjacent the cut-away notch, and a spring operatively connecting said main and secondary levers and applying downward pressure to said bridge member to retain the same from upward displacement in said cut-away notch.

17. In a control device, the combination with a casing having inlet and outlet passages and a valve controlling one of said passages, of a main lever arranged within said casing, a secondary lever arranged within said casing, each of said levers having bearing points, bearings for said levers, and a spring operatively connecting said main and secondary levers and at least partially supporting each of said levers in their assembled relation with their bearing points in pressure contact with their respective bearings, said secondary lever being operated by said spring to open said valve with a snap action.

18. In a control device, a multiplying lever having a knife edge pivot, an open bearing for said lever, a push rod for operating said lever so directed to force its pivot in said bearing in one direction, a spring engaging said lever and arranged to force said lever pivot in said bearing in a direction at an angle to the direction of the force applied by said push rod, whereby said pivot is securely held in position in said bearing, and a secondary lever pivotally mounted in said casing and connected to said spring and arranged to be actuated by movement thereof.

19. In a thermostatic control device, a main multiplying lever having a knife contact fulcrum bearing, a secondary lever having a knife contact fulcrum bearing, each lever having its free end extending generally toward the pivot point of the other lever, linkage means, under tension, connecting said levers and extending in general alinement therewith and arranged to exert a force tending to hold said levers in their bearings and to transmit movement from said main lever to said secondary lever, means for actuating said main lever, and control means arranged to be actuated by said secondary lever.

20. In a thermostatic control device, a main multiplying lever having a knife contact fulcrum bearing, a secondary lever having a knife contact fulcrum bearing, each lever having its free end extending generally toward the pivot point of the other lever, linkage means, under tension, connecting said levers and extending in general alinement therewith and arranged to exert a force tending to hold said levers in their bearings and to transmit movement from said main lever to said secondary lever, means for actuating said main lever, and control means arranged to be actuated by said secondary lever, said main lever actuating means being arranged to exert a force on said main lever at an angle to the direction of force exerted thereon by said tension means, said force tending to hold said main lever in its bearing.

21. In a thermostatic control device, a casing, a main lever having a knife-edge pivotal mounting in the casing, means for moving said lever about said pivot, a secondary lever having a knife-edge pivotal mounting in said casing, each of said levers having its free end extending generally toward the pivot point of the other, control means arranged to be actuated by said secondary lever, and tension means connecting the free ends of said levers and arranged to operate said secondary lever upon movement of said main lever to a sufficient extent to cause the tension means to move past the pivot point of said secondary lever.

HAROLD W. PRICE